(12) United States Patent
Sako et al.

(10) Patent No.: US 9,675,866 B2
(45) Date of Patent: Jun. 13, 2017

(54) MOVEMENT SUPPORTING METHOD AND APPARATUS

(75) Inventors: Yoichiro Sako, Tokyo (JP); Hirofumi Tamori, Tokyo (JP); Susumu Takatsuka, Tokyo (JP); Toshiro Terauchi, Tokyo (JP); Makoto Inoue, Tokyo (JP); Katsuya Shirai, Kanagawa (JP); Motoyuki Takai, Tokyo (JP); Kenichi Makino, Kanagawa (JP); Takatoshi Nakamura, Kanagawa (JP); Akihiro Komori, Tokyo (JP); Akane Sano, Tokyo (JP); Toru Sasaki, Tokyo (JP); Yuichi Sakai, Kanagawa (JP)

(73) Assignee: Sony Corporation, Tokyo (JP)

( * ) Notice: Subject to any disclaimer, the term of this patent is extended or adjusted under 35 U.S.C. 154(b) by 1538 days.

(21) Appl. No.: 11/591,735

(22) Filed: Nov. 2, 2006

(65) Prior Publication Data

US 2007/0154872 A1    Jul. 5, 2007

(30) Foreign Application Priority Data

Nov. 16, 2005    (JP) .................................. 2005-331197

(51) Int. Cl.
*A63B 71/06*    (2006.01)
*A63F 13/28*    (2014.01)
(Continued)

(52) U.S. Cl.
CPC .......... *A63B 71/0686* (2013.01); *A63B 24/00* (2013.01); *A63B 69/0028* (2013.01); *A63B 71/0622* (2013.01); *A63F 13/10* (2013.01); *A63F 13/28* (2014.09); *A63F 13/428* (2014.09); *A63B 24/0062* (2013.01); *A63B 2071/0625* (2013.01); *A63B 2071/0627* (2013.01); *A63B 2220/30* (2013.01); *A63B 2220/40* (2013.01); *A63B 2225/50* (2013.01);
(Continued)

(58) Field of Classification Search
CPC ........ A63B 71/0686; A63B 2071/0625; A63B 69/0028; A63B 24/0062; A63B 24/00; A63B 71/0622; A63B 2071/0627; A63B 2220/30; A63B 2220/40; G10H 2220/395; G10H 2220/371; G10H 1/40; G10H 1/00; G10H 2220/135; A63F 2300/8047; A63F 13/28; A63F 13/428; A63F 13/814; A63F 13/10; A63F 2300/638; G09B 15/00; G09B 19/0015
USPC ........................................ 434/236, 247, 256
See application file for complete search history.

(56) References Cited

U.S. PATENT DOCUMENTS 5,667,459 A    9/1997 Su
6,032,530 A    3/2000 Hock
(Continued)

FOREIGN PATENT DOCUMENTS

EP    0823270 A2    2/1998
EP    1101511 A2    5/2001
(Continued)

*Primary Examiner* — Jack Yip
(74) *Attorney, Agent, or Firm* — Wolf, Greenfield & Sacks, P.C.

(57) ABSTRACT

A movement supporting method includes the following steps: detecting a movement tempo of a user; determining whether a movement tempo detection value is within a target range; and outputting a warning when the movement tempo detection value is out of the target range.

24 Claims, 7 Drawing Sheets

(51) Int. Cl.
*A63F 13/428* (2014.01)
*A63B 69/00* (2006.01)
*A63F 13/40* (2014.01)
*A63F 13/814* (2014.01)
*G10H 1/40* (2006.01)
*A63B 24/00* (2006.01)

(52) U.S. Cl.
CPC ....... *A63F 13/814* (2014.09); *A63F 2300/638* (2013.01); *A63F 2300/8047* (2013.01); *G10H 1/40* (2013.01)

(56) References Cited

U.S. PATENT DOCUMENTS

| | | | |
|---|---|---|---|
| 6,716,139 B1 | 4/2004 | Hosseinzadeh-Dolkhani et al. | |
| 6,837,827 B1 | 1/2005 | Lee et al. | |
| 7,674,967 B2 | 3/2010 | Makino | |
| 2002/0002411 A1* | 1/2002 | Higurashi et al. | 700/91 |
| 2002/0146672 A1* | 10/2002 | Burdea et al. | 434/258 |
| 2003/0167908 A1* | 9/2003 | Nishitani et al. | 84/723 |
| 2003/0171189 A1 | 9/2003 | Kaufman | |
| 2004/0005924 A1* | 1/2004 | Watabe et al. | 463/36 |
| 2004/0033843 A1 | 2/2004 | Miller, IV et al. | |
| 2004/0102931 A1* | 5/2004 | Ellis | A61B 5/1038 702/188 |
| 2006/0052727 A1* | 3/2006 | Palestrant | A61B 5/1118 600/595 |
| 2006/0107822 A1* | 5/2006 | Bowen | 84/612 |

FOREIGN PATENT DOCUMENTS

| | | |
|---|---|---|
| EP | 1516583 A2 | 3/2005 |
| EP | 1533784 A2 | 5/2005 |
| JP | 01-076655 U | 5/1989 |
| JP | 10-290854 A | 11/1998 |
| JP | 11-128397 A | 5/1999 |
| JP | 2001-257746 A | 9/2001 |
| JP | 2002-153430 A | 5/2002 |
| JP | 2002-272890 A | 9/2002 |
| JP | 2004-121539 A | 4/2004 |
| JP | 2005-156641 A | 6/2005 |
| WO | WO 97/41925 | 11/1997 |
| WO | WO 2005/082472 A1 | 9/2005 |
| WO | WO 2006/085237 A1 | 8/2006 |

* cited by examiner

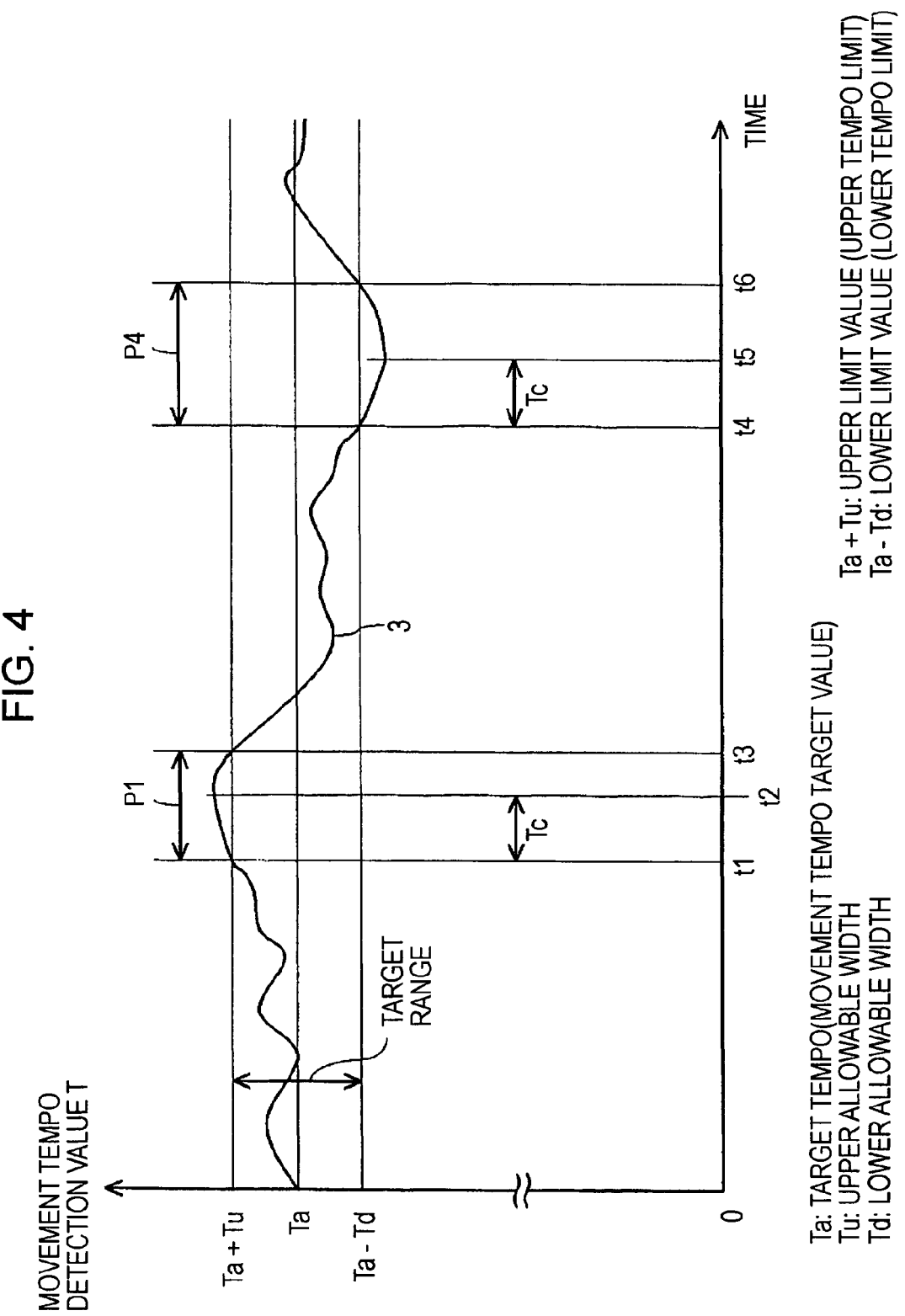

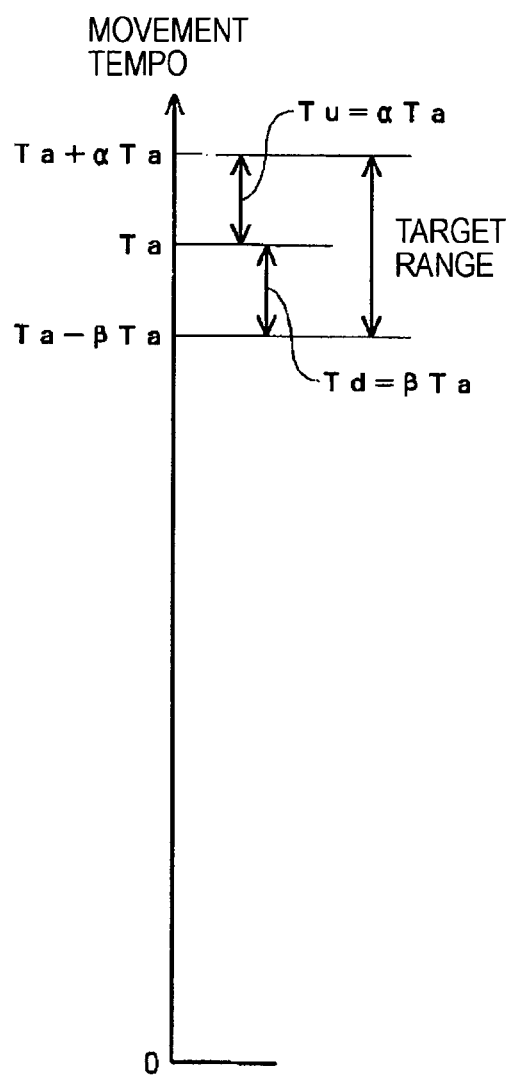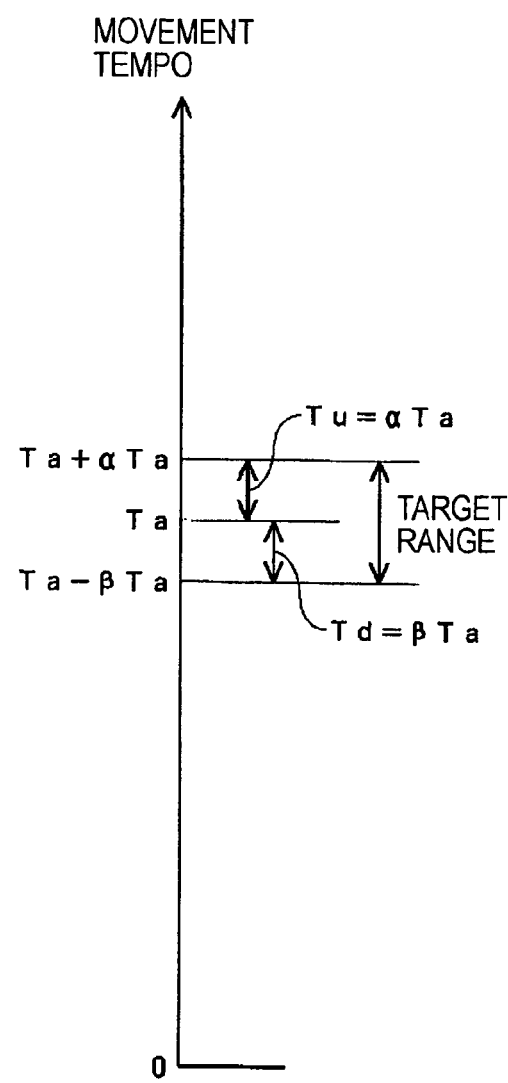

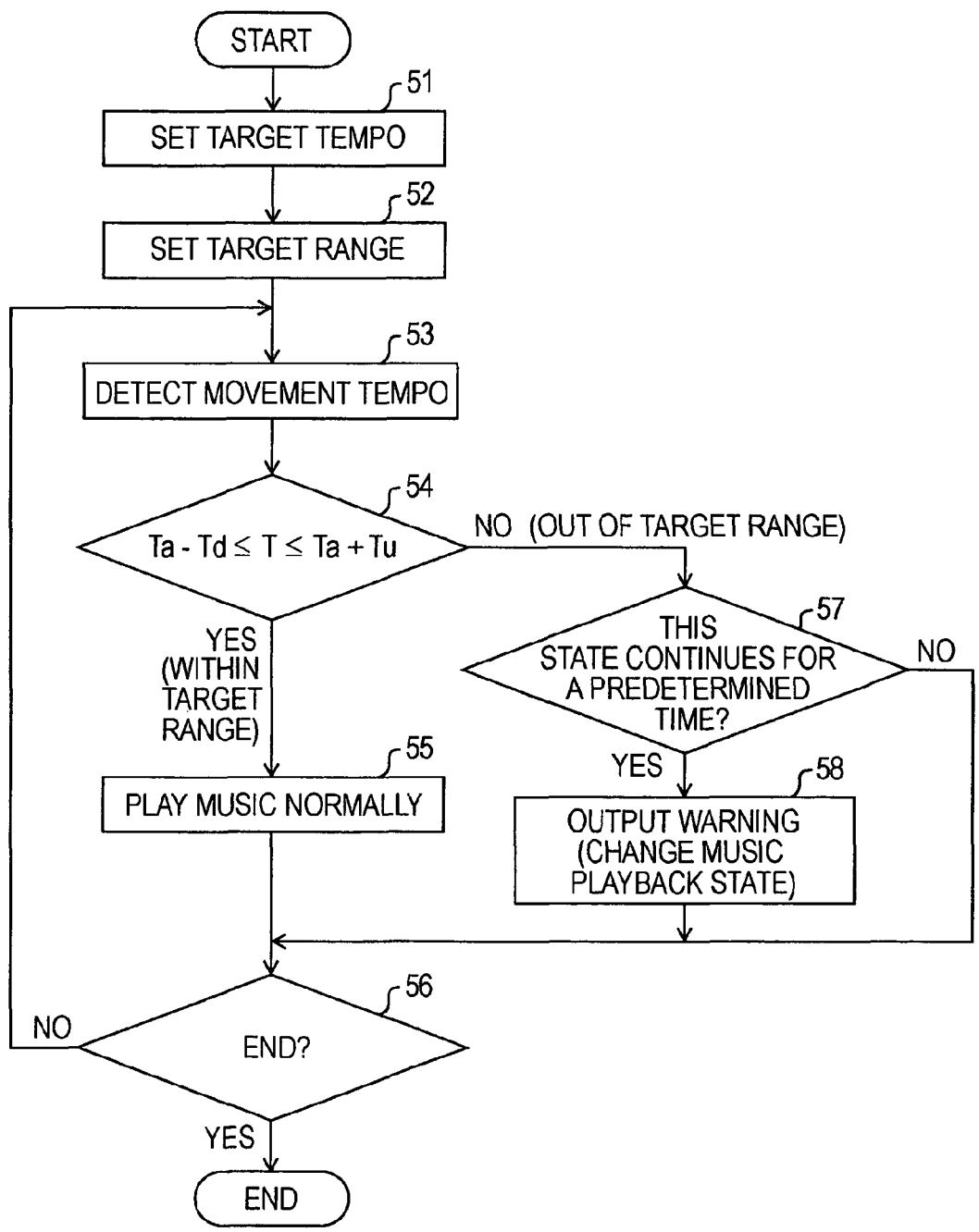

MOVEMENT SUPPORTING METHOD AND APPARATUS

CROSS REFERENCES TO RELATED APPLICATIONS

The present invention contains subject matter related to Japanese Patent Application JP 2005-331197 filed in the Japanese Patent Office on Nov. 16, 2005, the entire contents of which are incorporated herein by reference.

BACKGROUND OF THE INVENTION

1. Field of the Invention

The present invention relates to methods and apparatuses for supporting the movement of a user doing exercises or playing games.

2. Description of the Related Art

As people become more interested in becoming healthy and doing sports and make better use of leisure time, an increasing number of people are doing exercises including walking, jogging, various types of fitness programs, or various dances, or playing computer games or the like. Proposals have been made for methods and apparatuses for assisting or supporting doing such exercises or playing such games.

Specifically, a method of detecting the athletic strength of a test subject, which serves as an index of athletic performance of the test subject, by taking into consideration the test subject's comprehensive physical strength, and informing the test subject of the athletic strength is described in Japanese Unexamined Patent Application Publication No. 10-290854.

In Japanese Unexamined Patent Application Publication 2001-257746, a device for detecting vibrations made by walking and, on the basis of detected vibration information, computing the number of steps or the distance walked is described.

It is described in Japanese Unexamined Patent Application Publication No. 2002-272890 in which, when a user does a fitness program inside the house using a so-called "aero bike", which is a fixed bicycle, a virtual environment is created where the user feels as if the user were riding the bicycle outdoors.

It is described in Japanese Unexamined Patent Application Publication No. 2005-156641 in which, when a user is walking while listening to music, the playback speed of the music is adjusted to the walking tempo of the user.

SUMMARY OF THE INVENTION

When a user walks or jogs for a training purpose instead of taking a stroll without any purpose, the user tries to move while keeping the movement tempo (movement rhythm), such as the walking tempo or the jogging (running) tempo, within a certain range. For example, the user may want to jog at a relatively faster tempo (rhythm).

However, the techniques described in the above-described patent documents fail in supporting the movement of the user so that the movement tempo is kept within a certain range. For example, the method described in Japanese Unexamined Patent Application Publication No. 2005-156641 makes the playback speed of music dependent on the walking tempo. With this method, it is difficult to guide the walking tempo of a user to be within a certain range.

It is therefore desirable to support the movement of a user doing exercises or playing games so that the movement tempo of the user is kept within a predetermined range.

A movement supporting method according to an embodiment of the present invention has the following steps: detecting a movement tempo of a user; determining whether a movement tempo detection value is within a target range; and outputting a warning when the movement tempo detection value is out of the target range.

A movement supporting apparatus according to another embodiment of the present invention includes the following elements: detection means for detecting a movement tempo of a user; determining means for determining whether a movement tempo detection value is within a target range; output means for playing content, outputting a sound or light, or generating a vibration; and control means for allowing the output means to output a warning when it is determined by the determining means that the movement tempo detection value is out of the target range.

With the movement supporting method or apparatus arranged as described above according to the embodiment of the present invention, in the case where a user does exercises including walking, jogging, various types of fitness programs, or various types of dances, or plays computer games or the like, when the movement tempo of the user becomes out of a target range, a warning is given to the user to inform the user that the movement tempo is out of the target range by changing a playback state of music being played, outputting a beep or light, or generating a vibration. Therefore, the user can easily change the movement tempo so that the movement tempo is within the target range again.

According to the embodiments of the present invention, the movement of a user doing exercises or playing games can be supported so that the movement tempo of the user is kept within a predetermined range.

BRIEF DESCRIPTION OF THE DRAWINGS

FIG. 4 is a graph showing an exemplary relationship between a target range and a change in a movement tempo detection value;

FIGS. 5A and 5B are graphs showing the cases where an upper allowable width and a lower allowable width are proportional to a target tempo;

FIG. 7 is a flowchart of an exemplary process of supporting the movement.

DESCRIPTION OF THE PREFERRED EMBODIMENTS

1. Example of System (FIGS. 1 and 2)

1-1. Connection Configuration (FIG. 1)

Figure 1:
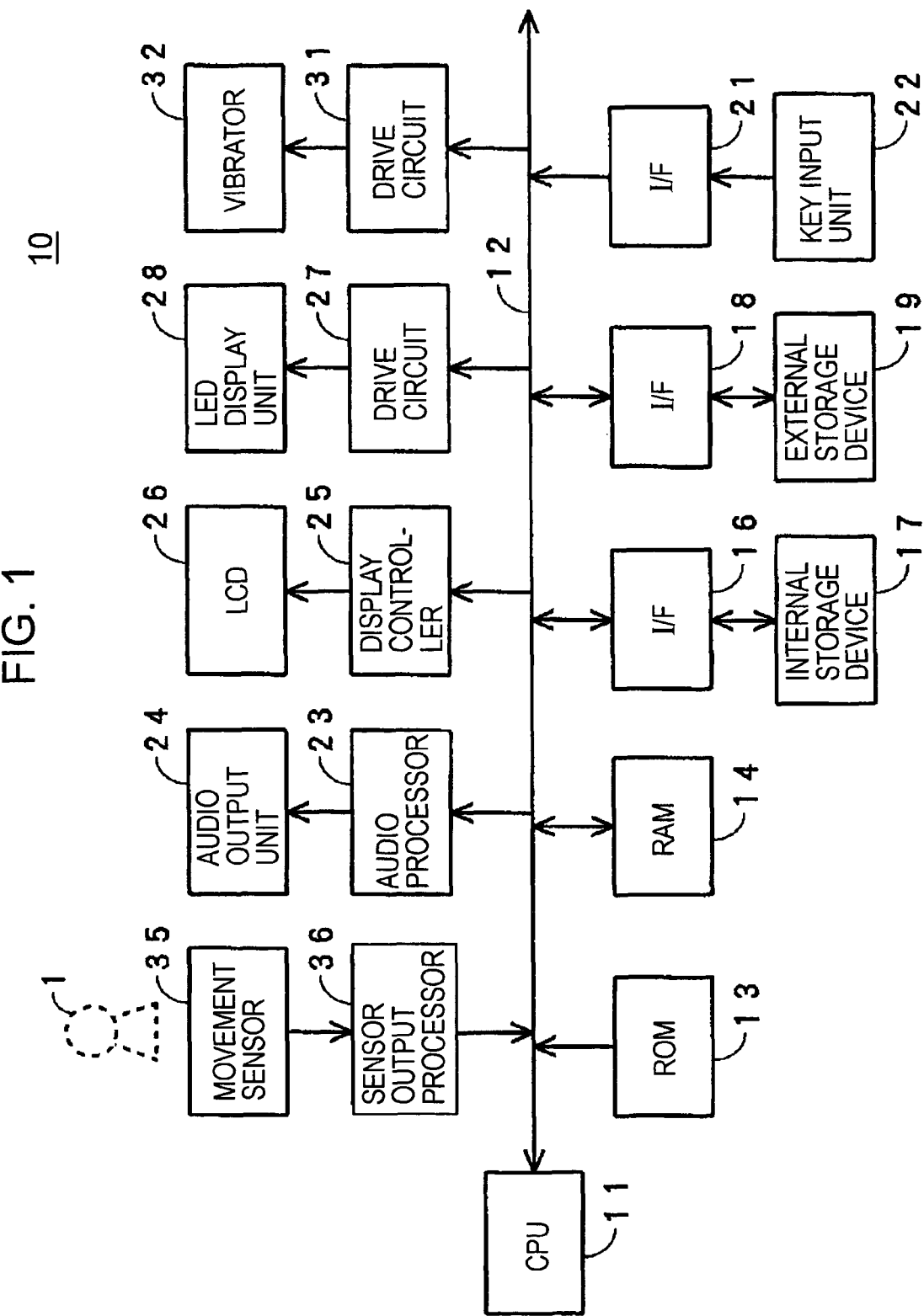
FIG. 1 is a block diagram of the connection configuration of a user terminal serving as an example of a movement supporting apparatus according to an embodiment of the present invention.
Figure 2:
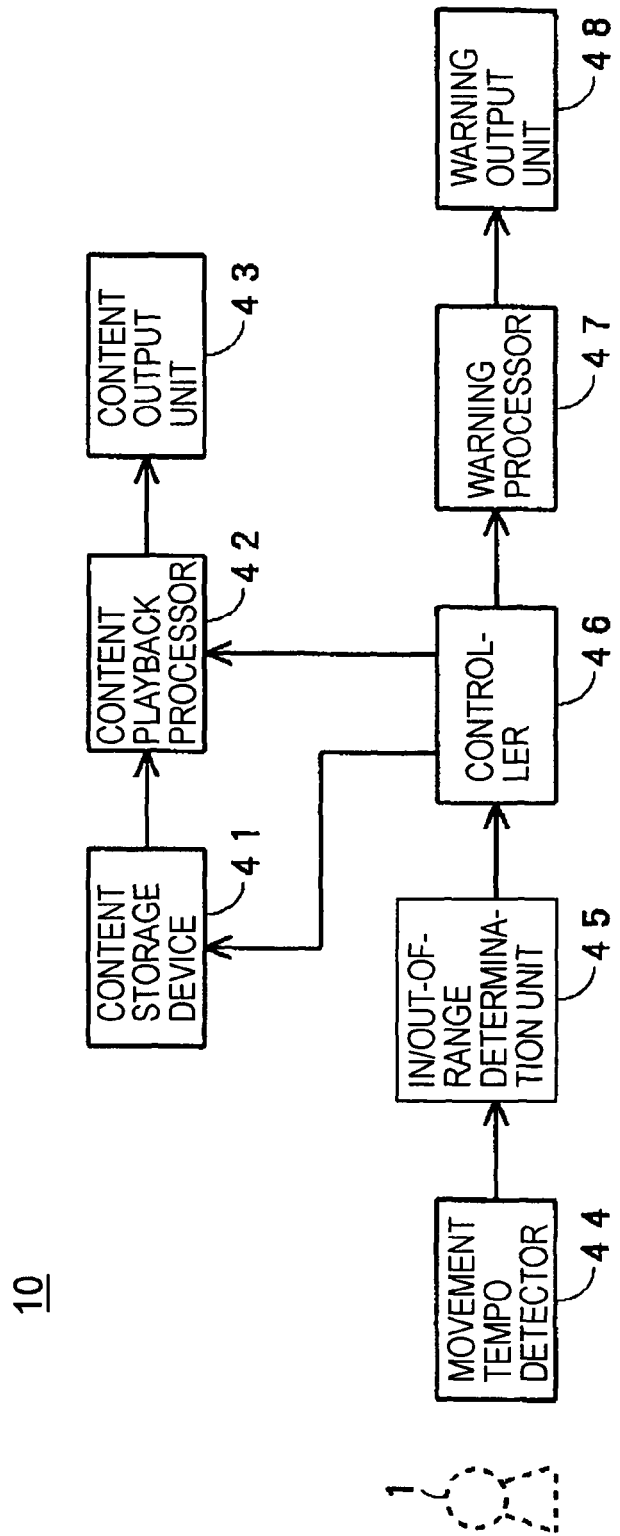
FIG. 2 is a block diagram of the functional configuration of the user terminal shown in FIG. 1.

FIG. 1 shows the connection configuration of a user terminal serving as an example of a movement supporting apparatus according to an embodiment of the present invention.

A user terminal 10 of this example includes a central processing unit (CPU) 11. A read only memory (ROM) 13 in which various programs and data are written and a random-access memory (RAM) 14 in which programs and data are developed are connected to a bus 12.

An internal storage device 17 is connected via an interface 16 to the bus 12, and an external storage device 19 is connected via an interface 18 to the bus 12. The internal storage device 17 is an internal hard disk or a semiconductor memory included in the user terminal 10, and the external storage device 19 is a removable storage device such as a compact disk (CD), a digital versatile disk (DVD), or a memory card. Music data (song data), video data (image data), or the like is stored in the internal storage device 17 or the external storage device 19.

Additionally, a key input unit 22 is connected via an interface 21 to the bus 12. An audio output unit 24 is connected via an audio processor 23 to the bus 12. A liquid crystal display (LCD) 26 is connected via a display controller 25 to the bus 12. A light-emitting diode (LED) display unit 28 is connected via a drive circuit 27 to the bus 12. A vibrator 32 is connected via a drive circuit 31 to the bus 12.

The audio output unit 24 is a speaker or a headphone and outputs played-back music or a warning beep. The LCD 26 displays played-back video or a setting screen. The LED display unit 28 outputs a warning by turning on or flashing an LED. The vibrator 32 outputs a vibration warning.

A movement sensor 35 is additionally connected via a sensor output processor 36 to the bus 12. The movement sensor 35 detects the physical movement of a user 1, such as the movement of the legs, hands, head, and arms of the user 1, the vertical and horizontal movement and the back-and-fourth movement of the body of the user 1, or the like. Specifically, the movement sensor 35 is an acceleration sensor, a speed sensor, a gyroscope, a pedometer, or a video camera.

The sensor output processor 36 converts an output signal of the movement sensor 35 into a digital signal and processes and analyzes the digital signal to detect the movement tempo of the user 1.

An acceleration sensor or the like serving as the movement sensor 35 may be included in or attached to the user terminal 10, which is worn on the hip or carried by the user 1. Alternatively, the movement sensor 35 may be a separate device from the user terminal 10 and attached to part of the body of the user 1 or the clothing of the user 1, and the movement sensor 35 may transmit an output signal (movement detection signal) to the user terminal 10 using wireless or wired communication with the user terminal 10.

1-2. Functional Configuration (FIG. 2)

To play back music or video, detect the movement tempo, and output a warning, the user terminal 10 of the example shown in FIG. 1 functionally includes, as shown in FIG. 2, a content storage device 41, a content playback processor 42, a content output unit 43, a movement tempo detector 44, an in/out-of-range determining unit 45, a controller 46, a warning processor 47, and a warning output unit 48.

The content storage device 41 includes the internal storage device 17 or the external storage device 19. The content playback processor 42 includes the audio processor 23 or the display controller 25. The content output unit 43 includes the audio output unit 24 or the LCD 26.

The movement tempo detector 44 includes the movement sensor 35 and the sensor output processor 36. The in/out-of-range determining unit 45 determines whether the movement tempo detected by the movement tempo detector 44 is within a target range and includes the sensor output processor 36, the CPU 11, and the like. The controller 46 includes the CPU 11, the ROM 13, and the RAM 14.

The warning processor 47 performs the processing to give a warning. The warning processor 47 includes the audio processor 23 or the display controller 25 when outputting a warning by changing the playback state of music or video or outputting a sound such as a beep. Alternatively, the warning processor 47 includes the drive circuit 27 when giving a warning by turning on or flashing the LED of the LED display unit 28. Alternatively, the warning processor 47 includes the drive circuit 31 when outputting a warning in terms of a vibration made by the vibrator 32.

The warning output unit 48 includes the audio output unit 24 or the LCD 26 when outputting a warning by changing the playback state of music or video or outputting a sound such as a beep. The warning output unit 48 includes the LED display unit 28 when outputting a warning by turning on or flashing the LED of the LED display unit 28. The warning output unit 48 includes the vibrator 32 when outputting a warning in terms of a vibration made by the vibrator 32.

In a content player such as the user terminal 10 of the example shown in FIG. 1, two operation modes are available, namely, a mode (movement supporting mode) where the movement supporting processing (warning output) is performed with the aforementioned configuration and a playback mode where no such processing is performed and content is played. The operation can be switched and selected between these two modes by the user 1 performing a switching operation.

2. Movement Supporting Method (FIGS. 3A and 3B to 7)

2-1. Detection of Movement Tempo (FIG. 3)

Figure 3A:
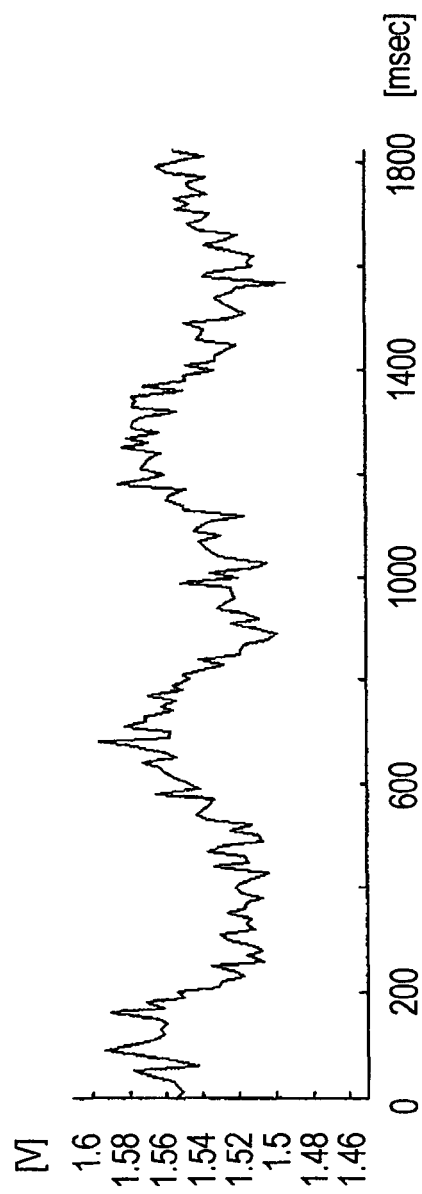
FIGS. 3A and 3B are waveform diagrams showing an exemplary sensor output signal and exemplary autocorrection.

FIG. 3A shows a sensor output signal in the case where the user 1 is walking, that is, an exemplary output signal of the movement sensor 35.

The sensor output signal in this case is such that a voltage V changes little by little within a short period of time and changes periodically in the entirety. This period indicates a walking tempo. The shorter the period, the faster the walking tempo. The longer the period, the slower the walking tempo.

Figure 3B:
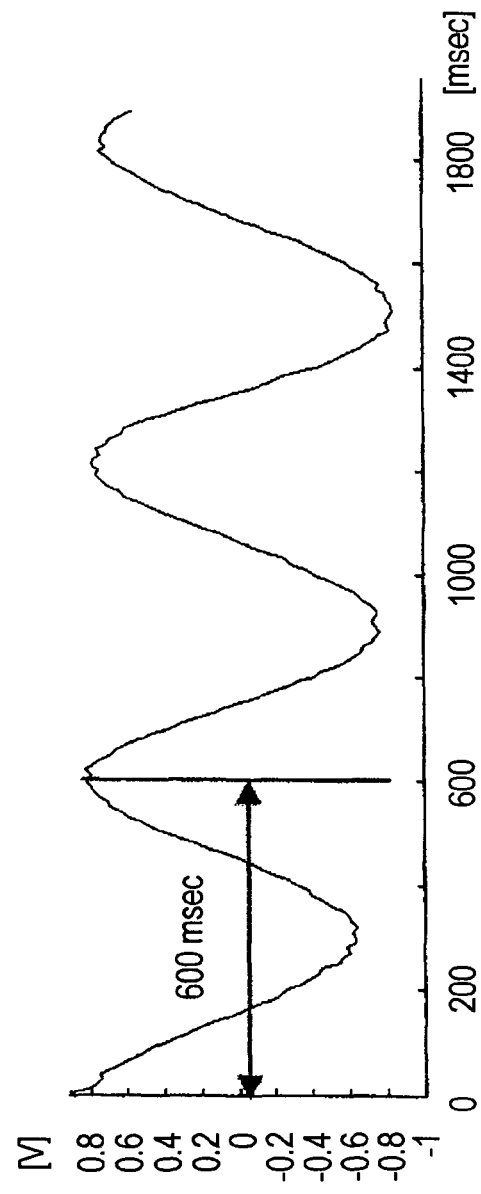

The movement tempo detector 44 in FIG. 2 detects a movement tempo of the user 1 from the sensor output signal using a method of computing an autocorrection function of the sensor output signal. If the sensor output signal is such as that shown in FIG. 3A, an autocorrection waveform thereof is shown in FIG. 3B, from which the movement tempo can be detected.

For example, if the walking period is 600 msec, one step involves 600 msec. This can be expressed as 100 steps per minute. This is converted into a musical tempo of 100 beats per minute (BPM) where one beat corresponds to a quarter note. FIGS. 3A and 3B show the case where the movement tempo (walking tempo) is 100 (100 steps per minute)

2-2. Setting of Target Tempo and Target Range (FIGS. 4, 5A, and 5B)

A movement supporting method according to an embodiment of the present invention sets a target tempo (movement tempo target value) and a target range using the following methods.

A first method involves instructing a target tempo to the user terminal 10 when the user starts walking or jogging. For example, when the user wants to jog at a movement tempo of around 170, the user instructs the movement tempo "170" to the controller 46 of the user terminal 10, which in turn sets the target tempo to 170.

A second method involves setting, when the user starts walking or jogging, a movement tempo upon the start of walking or jogging as a target tempo by the controller 46 of the user terminal 10. For example, when the movement tempo detector 44 detects that the movement tempo upon the start of the user movement is 120, the controller 46 sets the target tempo to 120. The movement tempo upon the start of the movement is, for example, an average of several detection values.

A third method involves setting, when the user walks or jogs while listening to music with the user terminal 10, a target tempo according to the tempo of the played-back music by the controller 46 of the user terminal 10. For example, if the tempo of the played-back music is 98, the target tempo is set to 98. This is because, when the user walks or jogs while listening to music, it is likely that the user walks or jogs according to the music.

In this case, if the tempo of this piece of music is described as music appendix information, the tempo of this piece of music can be promptly detected from this information. However, if the tempo of the piece of music is not described as music appendix information, the controller 46 of the user terminal 10 can detect the tempo of the piece of music from music data of the played-back music for a predetermined duration from the beginning.

Additionally, the controller 46 of the user terminal 10 sets a target range on the basis of the target tempo, which is instructed by the user 1 or set by the determination made by the controller 46.

FIG. 4 shows an exemplary relationship between the target tempo and the target range. A curve 3 in FIG. 4 indicates an exemplary change in the movement tempo detected by the movement tempo detector 44, that is, a movement tempo detection value T, with respect to time.

As shown in FIG. 4, the target range is from (Ta+Tu) to (Ta−Td) where Ta is the target tempo (movement tempo target value), Tu is an upper allowable width, and Td is a lower allowable width. Therefore, (Ta+Tu) is an upper limit value (upper limit tempo), and (Ta−Td) is a lower limit value (lower limit tempo).

The upper allowable width Tu and the lower allowable width Td are, for example, constant regardless of the target tempo Ta. In this case, the upper allowable width Tu and the lower allowable width Td may be of the same width or of different widths instead.

Furthermore, in this case, instead of setting the upper allowable width Tu and the lower allowable width Td to fixed values in the user terminal 10, the user 1 may instruct the upper allowable width Tu and the lower allowable width Td.

Alternatively, as shown in FIGS. 5A and 5B, the upper allowable width Tu and the lower allowable width Td may be proportional to the target tempo Ta.

That is, in this case, Tu=αTa, and Td=βTa where α and β are proportionality coefficients and are the same value or different values instead.

FIG. 5A shows the case where the target tempo Ta is a relatively large value, e.g., 180, and the upper allowable width Tu and the lower allowable width Td are set to relatively large values. FIG. 5B shows the case where the target tempo Ta is a relatively small value, e.g., 120, and the upper allowable width Tu and the lower allowable width Td are set to relatively small values.

In the case where the upper allowable width Tu and the lower allowable width Td are constant regardless of the target tempo Ta, the larger the target tempo Ta, the more difficult it is to maintain the actual movement tempo within the target range. This difficulty may be avoided by setting the upper allowable width Tu and the lower allowable width Td to be proportional to the target tempo Ta, as shown in FIGS. 5A and 5B.

In this case, the user may instruct the proportionality coefficients α and β to the user terminal 10 instead of setting the proportionality coefficients α and β to fixed values in the user terminal 10.

Figure 6:
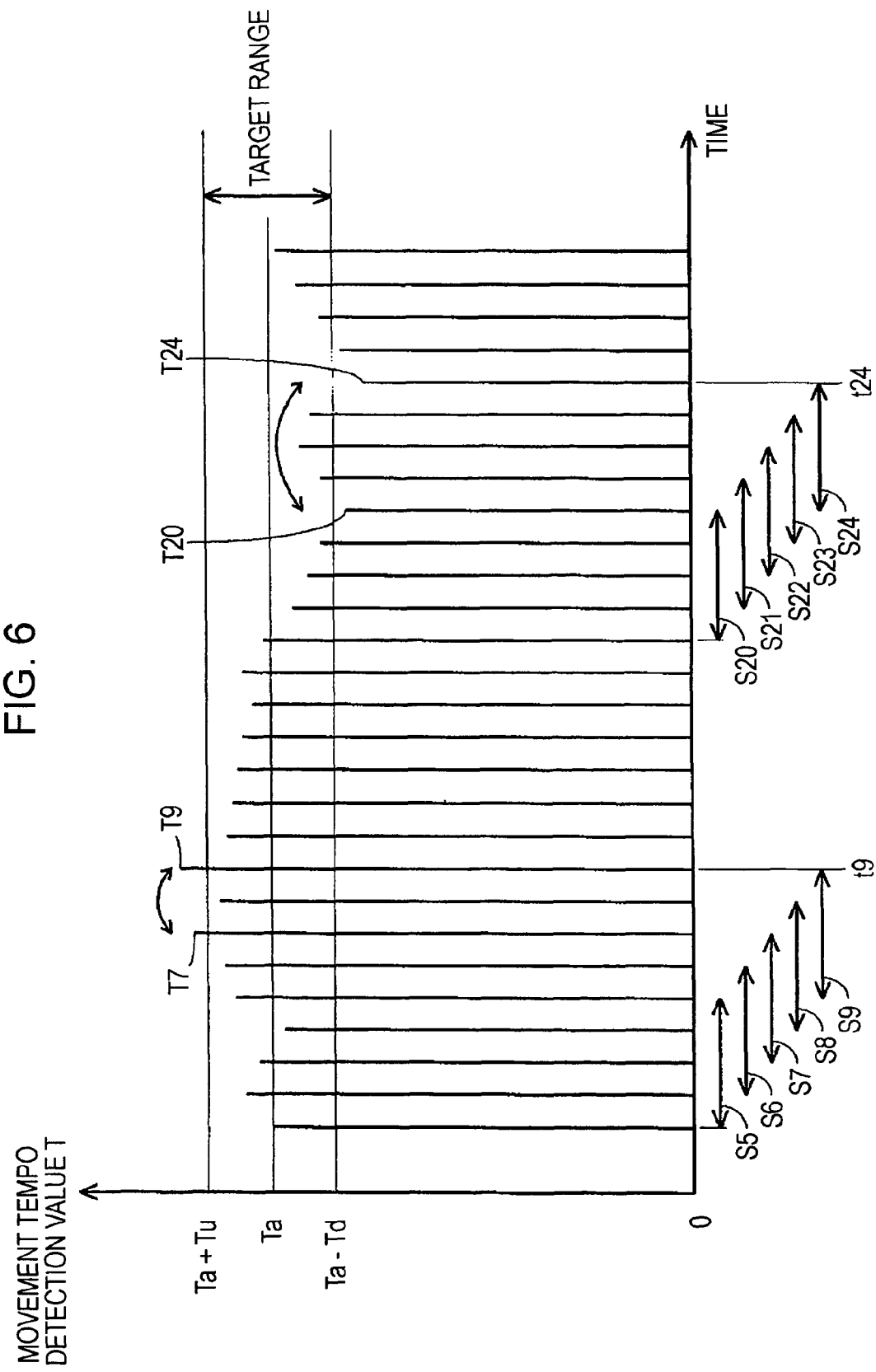
FIG. 6 is a graph showing another exemplary relationship between the target range and the movement tempo detection value.

2-3. Determination of Whether Movement Tempo is Within Target Range (FIGS. 4 and 6)

The in/out-of-range determining unit 45 shown in FIG. 2 determines whether the movement tempo detection value T, which is output from the movement tempo detector 44, is within the target range set in the above-described manner.

Referring to FIG. 4, the movement tempo detection value T changes with time, as indicated by the curve 3. At time t1, the movement tempo detection value T exceeds the target range. At time t3, the movement tempo detection value T becomes within the target range again. At time t4, the movement tempo detection value T falls below the target range. At time t6, the movement tempo detection value T becomes within the target range again.

In this case, when the movement tempo detection value T becomes out of the target range at time t1 or time t4, the user terminal 10 may promptly output a warning. For example, the user terminal 10 is configured to output a warning when the movement tempo detection value T has been out of the target range for a predetermined period of time Tc or longer, that is, at time t2 and time t5 in the case of FIG. 4.

In FIG. 4, since warnings are output at time t2 and time t4, the user notices that the movement tempo is out of a certain range (target range). Immediately after time t2, the user slows down the movement tempo. Immediately after time t5, the user speeds up the movement tempo. As a result, the movement tempo detection value T becomes within the target range at time t3 and time t6. Therefore, periods P1 and P4 are periods during which the movement tempo detection value T is out of the target range.

Instead of outputting a warning when the movement tempo detection value T has been out of the target range for the predetermined period of time Tc or longer, the user terminal 10 may be configured to output a warning when the movement tempo detection value T is out of the target range at least N times in the recent M detections.

Specifically, it is shown in FIG. 4 for convenience that the movement tempo detection value T is continuously obtained. Actually, however, the movement tempo is detected from the autocorrection waveform of the sensor output signal, as shown in FIGS. 3A and 3B. Therefore, the movement tempo detection value T is detected in samples, as shown in FIG. 6.

In a method shown in FIG. 6, M=5, and N=2, and a warning is output when the movement tempo detection value T is out of the target range twice or more in the recent five detections including S5, S6, S7, . . . , S22, S23, S24, . . . .

In the case of FIG. 6, no warning is output at a time at which a detection value T7 is obtained. When a detection value T9 is obtained at time t9, the movement tempo detection value T is regarded as being apt to exceed the target range, and a warning is output. Similarly, no warning is output at a time at which a detection value T20 is obtained. When a detection value T24 is obtained at time t24, the movement tempo detection value T is regarded as being apt to fall below the target range, and a warning is output.

In the aforementioned method, M is an integer greater than or equal to three, and N is an integer greater than or equal to two and smaller than M.

Alternatively, a warning may be output when the average of the movement tempo detection values T obtained in a predetermined period of time (a predetermined number of detections) is out of the target range.

If a warning is promptly output when the movement tempo detection value T is out of the target range even once, a warning is output when the user is at a corner of the road and the movement tempo detection value T is out of the target range, which may be bothersome to the user. This problem may be avoided in the case shown in FIG. 4 where a warning is output when the movement tempo detection value T has been continuously out of the target range for a predetermined period of time (a predetermined number of detections) or longer, in the case shown in FIG. 6 where a warning is output when the movement tempo detection value T is out of the target range at least N times in the recent M detections, or in the case where a warning is output when the average of the movement tempo detection values T obtained in a predetermined period of time (a predetermined number of detections) is out of the target range.

2-4. Movement Supporting Process (FIG. 7)

FIG. 7 is a flowchart of an exemplary movement supporting process performed by the user terminal 10 in the case where a user walks or jogs while listening to music played by the user terminal 10.

The exemplary movement supporting process starts in response to an instruction from the user when the user starts walking or jogging. In step S51, the controller 46 sets the target tempo Ta. In step S52, the controller 46 sets the target range.

When the movement tempo upon the start of the movement of the user is set as the target tempo Ta, as has been described above, in step S51, the movement tempo upon the start of the movement is detected, and the detected tempo is set as the target tempo Ta.

In step S53, the movement tempo detector 44 detects the movement tempo. In step S54, the in/out-of-range determining unit 45 determines whether the movement tempo detection value T is within a range from the lower limit value (lower limit tempo) or (Ta−Td) to the upper limit value (upper limit tempo) or (Ta+Tu), that is, within the target range.

When the movement tempo detection value T is within the target range, the flow proceeds from step S54 to step S55. In step S55, the controller 46 controls the user terminal 10 to play music in a normal state. In step S56, the controller 46 determines whether to end the movement supporting process in response to a user instruction. If the controller 46 determines not to end the process, the flow returns to step S53, and the controller 46 allows the movement tempo detector 44 to continue detecting the movement tempo.

If it is determined in step S54 that the movement tempo detection value T is out of the target range, in step S57, the controller 46 determines in this case whether this state has continued for a predetermined period of time. If this state has not continued for the predetermined period of time, in step S56, the controller 46 determines whether to end the movement supporting process. If the controller 46 determines not to end the process, the flow returns to step S53, and the controller 46 allows the movement tempo detector 44 to continue detecting the movement tempo.

In contrast, when it is determined in step S57 that the movement tempo detection value T has been continuously out of the target range for the predetermined period of time, in step S58, the controller 46 outputs a warning by changing the playback state of music, as will be described below. That is, the controller 46 warns the user that the user is out of tempo. In step S56, the controller 46 determines whether to end the movement supporting process. If the controller 46 determines not to end the process, the flow returns to step S53, and the controller 46 allows the movement tempo detector 44 to continue detecting the movement tempo.

2-5. Types of Warnings

A warning, that is, a warning indicating that the movement is out of tempo, is output using the following methods.

Changing Playback State of Content

A first method is performed to output a warning by changing the playback state of content being played when music or video is played, that is, when a user exercises or plays while listening to music or watching video.

For example, when music is played as in the aforementioned example, the playback state of the music is changed. Specifically, the playback state of the music is changed in the following manners:

(a) When the movement tempo exceeds the target range such as at time t2 in FIG. 4 or time t9 in FIG. 6, the playback tempo of the music being played is increased much faster than the original tempo so that the user can be informed that the movement tempo exceeds the target range. When the movement tempo falls below the target range such as at time t5 in FIG. 4 or time t24 in FIG. 6, the playback tempo of the music being played is reduced much slower than the original tempo so that the user can be informed that the movement tempo falls below the target range;

(b) The music is played without a vocal part;

(c) Only one of two stereo channels (left and right) is played;

(d) The left and right channels are reversed and played;

(e) The playback of the music is stopped; and (f) A different piece of music is played instead of the music being played.

When video (image) is played, the playback state of the video is changed. Specifically, the playback state of the video is changed in the following manners:

(g) When the movement tempo exceeds the target range, the playback tempo of the video being played is increased much faster than the original tempo (the video is played fast) so that the user can be informed that the movement tempo exceeds the target range. When the movement tempo falls below the target range, the playback tempo of the video being played is reduced much slower than the original tempo (the video is played slowly) so that the user can be informed that the movement tempo falls below the target range;

(h) The brightness, contrast, or saturation of the video being played is reduced, and the video is played;

(i) The playback of the video is stopped; and (j) Another image, such as a still image, is played instead of the video being played.

Changing or Stopping Sound Output

A second method, which is applicable when music or video is played or not played, outputs a beep, a noise, or another sound, changes the frequency of a sound being output from that in the case of the target range, or stops output of a sound when the movement tempo exceeds or falls below the target range.

In this case, different beeps or noises may be output in the cases where the movement tempo exceeds and falls below the target range. Alternatively, the frequency of a sound being output may be changed in the cases where the movement tempo exceeds and falls below the target range.

Outputting or Changing Light or Stopping Light Output

A third method, which is applicable when music or video is played or not played, outputs light, changes a light output mode, or stops output of light when the movement tempo exceeds or falls below the target range.

Specifically, when the movement tempo exceeds or falls below the target range, the user terminal 10 of the example shown in FIG. 1 performs the following:

(k) The LED display unit 28 turns on or flashes the LED;
(l) The LED of the LED display unit 28, which has been turned on, is changed to flashing; or the LED display unit 28 whose LED has been turned on to emit light of a certain color is changed to emit light of a different color; and
(m) The LED of the LED display unit 28, which has been turned on, is turned off.

Generating, Changing, or Stopping Vibration

A fourth method, which is applicable when music or video is played or not played, generates a vibration, changes a vibration mode, or stops a vibration. The fourth method can be executed by the drive circuit 31 and the vibrator 32 in the user terminal 10 of the example shown in FIG. 1.

It should be understood by those skilled in the art that various modifications, combinations, sub-combinations, and alterations may occur depending on design requirements and other factors insofar as they are within the scope of the appended claims or the equivalents thereof.

What is claimed is:

1. A movement supporting method comprising the steps of:
    recording, by at least one movement sensor attached to a user, a first sensor output signal when the user starts moving;
    transforming the first sensor output signal into a first autocorrection waveform by computing an autocorrection function of the first sensor output signal;
    determining a first movement tempo value of the user based on the first autocorrection waveform;
    setting, by at least one computer processor, a target tempo of an exercise performed by the user, wherein the target tempo of the exercise is set based, at least in part, on the first movement tempo value;
    recording, by the at least one movement sensor, a second sensor output signal during performance of the exercise by the user;
    transforming the second sensor output signal into a second autocorrection waveform by computing an autocorrection function of the second sensor output signal;
    determining, based on the second autocorrection waveform, a plurality of second movement tempo values of the user during performance of the exercise, wherein each of the plurality of second movement tempo values indicates a rate of physical movements performed by the user during a fixed time interval during performance of the exercise;
    determining, with the at least one computer processor, whether the plurality of second movement tempo values are outside of a target range that includes the target tempo for a predetermined period of time; and
    outputting a warning when it is determined that the plurality of second movement tempo values are outside of the target range for the predetermined period of time, wherein outputting a warning comprises outputting a first warning when it is determined that the plurality of second movement tempo values exceed the target range for the predetermined period of time and outputting a second warning when it is determined that the plurality of second movement tempo values fall below the target range for the predetermined period of time, wherein the first warning and the second warning are different.

2. The movement supporting method according to claim 1, wherein the target range has an upper allowable width and a lower allowable width above and below the target tempo, respectively.

3. The movement supporting method according to claim 2, wherein the upper allowable width and the lower allowable width are functions of the target tempo and increase as the target tempo increases.

4. The movement supporting method according to claim 1, wherein the warning is output by changing a playback state of content being played.

5. The movement supporting method according to claim 1, wherein the warning is output by outputting a beep, a noise, or another sound, changing a sound being output, or stopping output of a sound.

6. The movement supporting method according to claim 1, wherein the warning is output by outputting light, changing a light output mode, or stopping output of light.

7. The movement supporting method according to claim 1, wherein the warning is output by generating a vibration, changing a vibration mode, or stopping output of a vibration.

8. The movement supporting method according to claim 1, wherein determining the first movement tempo comprises:
    detecting a plurality of detection values when the user starts moving; and
    determining the first movement tempo value based, at least in part, on an average of the plurality of detection values.

9. The movement supporting method according to claim 1, further comprising determining a tempo of music being played when the user is moving, and wherein setting the target tempo is further based, at least in part, on the determined tempo of music being played when the user is moving.

10. The movement supporting method according to claim 9, wherein determining the tempo of music being played when the user is moving comprises determining the tempo of music based, at least in part, on music appendix information associated with the music.

11. The movement supporting method according to claim 1, wherein recording a first movement sensor output signal when the user starts moving comprises determining a first movement tempo of a user when the user starts walking, jogging, or running, and wherein the first movement tempo value corresponds to a walking, jogging, or running pace of the user.

12. The movement supporting method according to claim 1, wherein the at least one movement sensor is selected from the group consisting of an acceleration sensor, a gyroscope, and a pedometer.

13. The movement supporting method according to claim 1, wherein the at least one movement sensor is configured for attachment to a part of a body of the user or is configured for attachment to clothing of the user.

14. A movement supporting apparatus comprising:
    at least one movement sensor attachable to a user, wherein the at least one movement sensor is configured to record a first sensor output signal when the user starts moving and record a second sensor output signal during performance of an exercise by the user; and
    at least one computer processor programmed to:
        transform the first sensor output signal into a first autocorrection waveform by computing an autocorrection function of the first sensor output signal;
        determine a first movement tempo value of the user based on the first autocorrection waveform;

set a target tempo of the exercise performed by the user, wherein the target tempo of the exercise is set based, at least in part, on the first movement tempo value;

transform the second sensor output signal into a second autocorrection waveform by computing an autocorrection function of the second sensor output signal;

determine, based on the second autocorrection waveform, a plurality of second movement tempo values of the user during performance of the exercise, where each of the plurality of second movement tempo values indicates a rate of physical movements performed by the user during a fixed time interval during performance of the exercise;

determine whether the plurality of second movement tempo values are outside of a target range that includes the target tempo for a predetermined period of time; and output a warning when it is determined that the plurality of second movement tempo values are outside of the target range for the predetermined period of time, wherein outputting a warning comprises performing at least one action selected from the group consisting of changing a playback state of content being output by the movement supporting apparatus, outputting a sound, outputting a light, and generating a vibration, wherein outputting a warning comprises outputting a first warning when it is determined that the plurality of second movement tempo values exceed the target range for the predetermined period of time and outputting a second warning when it is determined that the plurality of second movement tempo values fall below the target range for the predetermined period of time, wherein the first warning and the second warning are different.

15. The movement supporting apparatus according to claim 14, wherein the target range has an upper allowable width and a lower allowable width above and below the target tempo, respectively.

16. The movement supporting apparatus according to claim 15, wherein the upper allowable width and the lower allowable width are functions of the target tempo and increase as the target tempo increases.

17. The movement supporting apparatus according to claim 14, wherein the at least one computer processor is further programmed to output the warning when an average of the plurality of second movement tempo values detected by the at least one movement sensor in the predetermined period of time is outside of the target range.

18. The movement supporting apparatus according to claim 14, wherein the at least one computer processor is further programmed to output the warning by changing the playback state of the content being output by the movement supporting apparatus.

19. The movement supporting apparatus according to claim 14, wherein the at least one computer processor is further programmed to output the warning by outputting a beep, a noise, or another sound, changing a sound being output, or stopping output of a sound.

20. The movement supporting apparatus according to claim 14, wherein the at least one computer processor is further programmed to output the warning by outputting light, changing a light output mode, or stopping output of light.

21. The movement supporting apparatus according to claim 14, wherein the at least one computer processor is further programmed to output the warning by generating a vibration, changing a vibration mode, or stopping output of a vibration.

22. The movement supporting apparatus according to claim 14, wherein the at least one first movement sensor is configured to record the first sensor output signal when the user starts walking, jogging, or running, and wherein the first movement tempo value corresponds to a walking, jogging, or running pace of the user.

23. The movement supporting apparatus according to claim 14, wherein the at least one movement sensor is selected from the group consisting of an acceleration sensor, a gyroscope, and a pedometer.

24. An exercise system configured to selectively operate in a movement supporting mode or a playback mode, the exercise system comprising:

a content player configured to output music or video content;

a movement sensor attachable to a user, the movement sensor configured to record a first sensor output signal when a user starts moving and record a second sensor output signal during performance of an exercise by the user;

movement tempo detector circuitry configured to:
transform the first sensor output signal into a first autocorrection waveform by computing an autocorrection function of the first sensor output signal;
determine a first movement tempo value of the user based on the first autocorrection waveform;
transform the second sensor output signal into a second autocorrection waveform by computing an autocorrection function of the second sensor output signal; and
determine, based on the second autocorrection waveform, a plurality of second movement tempo values of the user during performance of the exercise, wherein each of the plurality of second movement tempo values indicates a rate of physical movements performed by the user during a fixed time interval during performance of the exercise;

a controller configured to set a target tempo of the exercise performed by the user, wherein the target tempo of the exercise is set based, at least in part, on the first movement tempo value;

a determining unit operable to determine whether the plurality of second movement tempo values are outside of a target range that includes the target tempo for a predetermined period of time; and a warning output unit configured to output a sound or light, or generate a vibration;

wherein the controller is further configured to instruct the warning output unit to output a warning when it is determined by the determining unit that the plurality of second movement tempo values are outside of the target range for the predetermined period of time, wherein outputting a warning comprises outputting a first warning when it is determined that the plurality of second movement tempo values exceed the target range for the predetermined period of time and outputting a second warning when it is determined that the plurality of second movement tempo values fall below the target range for the predetermined period of time, wherein the first warning and the second warning are different.

* * * * *